United States Patent
Liu et al.

(10) Patent No.: US 12,167,513 B2
(45) Date of Patent: Dec. 10, 2024

(54) LED DIMMING CIRCUIT

(71) Applicant: CRM ICBG (WUXI) CO., LTD., Jiangsu (CN)

(72) Inventors: Jun Liu, Jiangsu (CN); Guocheng Li, Jiangsu (CN); Quanqing Wu, Jiangsu (CN)

(73) Assignee: CRM ICBG (WUXI) CO., LTD., Jiangsu (CN)

( * ) Notice: Subject to any disclaimer, the term of this patent is extended or adjusted under 35 U.S.C. 154(b) by 0 days.

(21) Appl. No.: 17/915,093

(22) PCT Filed: Nov. 22, 2021

(86) PCT No.: PCT/CN2021/132133
§ 371 (c)(1),
(2) Date: Feb. 5, 2024

(87) PCT Pub. No.: WO2022/142856
PCT Pub. Date: Jul. 7, 2022

(65) Prior Publication Data
US 2024/0268006 A1 Aug. 8, 2024

(30) Foreign Application Priority Data
Dec. 30, 2020 (CN) .......................... 202011611456.3

(51) Int. Cl.
*H05B 45/10* (2020.01)
*H05B 45/325* (2020.01)
(Continued)

(52) U.S. Cl.
CPC ........... *H05B 45/10* (2020.01); *H05B 45/325* (2020.01); *H05B 45/345* (2020.01); *H05B 45/59* (2022.01)

(58) Field of Classification Search
CPC ...... H05B 45/10; H05B 45/30; H05B 45/325; H05B 45/345; H05B 45/59; H05B 47/10
See application file for complete search history.

(56) References Cited

U.S. PATENT DOCUMENTS

| 2012/0019714 A1* | 1/2012 | Hiramatu | H05B 47/16 348/370 |
|---|---|---|---|
| 2014/0042919 A1 | 2/2014 | Yang | |
| 2021/0100082 A1* | 4/2021 | Aoki | H05B 45/305 |

FOREIGN PATENT DOCUMENTS

| CN | 105657903 A | 6/2016 |
|---|---|---|
| CN | 108419331 A | 8/2018 |
| KR | 20080100000 A | 11/2008 |

* cited by examiner

*Primary Examiner* — Jimmy T Vu
(74) *Attorney, Agent, or Firm* — Global IP Services; Tianhua Gu

(57) ABSTRACT

A LED dimming circuit, including a low-level-voltage generation module, a high-level-voltage generation module, a base-voltage generation module, and a dimming-signal generation module. By counting the high and low levels of a low-frequency PWM signal, high and low-level voltages with respect to time are obtained; a constant current source and a capacitor are used to convert high-frequency switching signals to a DC base voltage that is only related to the duty cycle of the low-frequency PWM signal. When the base voltage is greater than a predetermined voltage, the base voltage is output as the dimming signal; when the base voltage is less than the predetermined voltage, a new PWM signal is output as the dimming signal, whose magnitude is the same of that of the predetermined voltage, wherein the average values of the new PWM signal and the base voltage are the same.

15 Claims, 3 Drawing Sheets

(51) Int. Cl.
*H05B 45/345* (2020.01)
*H05B 45/59* (2022.01)

LED DIMMING CIRCUIT

CROSS REFERENCE TO RELATED PATENT APPLICATION

The present application is the US national stage of PCT/CN2021/132133 filed on 2021 Nov. 22, which claims the priority of the Chinese patent application No. 202011611456.3 filed on 2020 Dec. 30, which application is incorporated herein by reference.

FIELD OF TECHNOLOGY

The present invention belongs to the field of integrated circuit design, and in particular relates to an LED dimming circuit.

BACKGROUND

In applications of LED lighting, there are usually two dimming methods, and one is analog dimming, that is, by adjusting a base voltage to adjust the LED's output current so as to achieve dimming (as shown in FIG. 1a); one of its advantages is that it can output without strobe, but its dimming depth is relatively small, usually only about 3%; and because the dimming depth is small, the base voltage will also be very small, which lowers chip precision; in addition, when the LED's output current is too small, there will be color shift. Another method is pulse width modulation (PWM) dimming, that is, through a PWM dimming signal to adjust the LED's output current to achieve dimming (as shown in FIG. 1b). This dimming method also has some problems: the LED's output current changes as the PWM dimming signal changes, and therefore if the PWM dimming signal's frequency is too low, it will result in flickering visible to the human eye, but if the PWM dimming signal's frequency is increased in order to avoid flickering, then the minimum on-time of the PWM dimming signal will be limited (for example, with a frequency of 1 kHz to achieve 0.1% dimming depth, the corresponding minimum on-time needs to be 1 uS), and micro-controllers producing dimming signals are usually unable to output PWM signals with such a small on-time. Also, because the LED's output current changes from 0 to 100% in the circuit, audio noise is more likely to occur in a circuit, affecting the user's experience.

In order to solve the shortcomings of the above two dimming methods, another dimming method was proposed, which is a combination of analog dimming and PWM dimming (as shown in FIG. 1c): when outputting a small current, the duty cycle of the PWM signal is reduced, and the base voltage is also reduced to get a relatively low LED output current; for example, the base voltage is reduced to 10%, and the duty cycle of the PWM signal is reduced to 1%, and as a result, the output current will be reduced to 0.1%, in which case, the minimum duty cycle corresponding to a frequency of 1 kHz needs only to be 10 uS, which is a criterion that most micro-controllers can meet; also, the small current no longer changes from 0 to 100%, but 0 to 10%, which can relatively reduce ripples in the output current and reduce noise.

But this dimming method is still defective. First of all, the PWM dimming signal's frequency still cannot be too low, otherwise there will be strobes, and according to the IEEE-STD-1789 standard, when the modulation index is 100%, the dimming frequency needs to be greater than 3 kHz in order for the light to be safe to the human eye, therefore, the dimming frequency range is limited; second, outputting a PWM signal that carries analog signals is a rather demanding task for most micro-controllers; in addition, the PWM dimming signal' amplitude and duty cycle will have an impact on the LED's output current, thus there are still high requirements for the modulation of the PWM dimming signal.

SUMMARY

In view of the above-mentioned shortcomings of the prior art, the purpose of the present invention is to provide an LED dimming circuit to solve problems in the existing dimming method of combining analog dimming and PWM dimming, such as limited dimming frequency and high requirements for the micro-controller that generates the dimming signal.

To achieve the above purpose and other related purposes, the present invention provides a LED dimming circuit, and the LED dimming circuit includes:

a low-level-voltage generation module, which performs a low-level counting operation comprising counting cycles of a high-frequency clock signal during a low level duration of a low-frequency PWM signal in order to measure the low level duration, after which the low level duration is converted to obtain a low-level voltage, wherein the low-level voltage has a value corresponding to the low level duration;

a high-level-voltage generation module, which performs high-level counting operation comprising counting cycles of the high-frequency clock signal during a high level duration of the low-frequency PWM signal in order to measure the high level duration, after which the high level duration is converted to obtain a high-level voltage, wherein the high-level voltage has a value corresponding to the high level duration;

a base-voltage generation module, connected to an output of the low-level-voltage generation module and to an output of the high-level-voltage generation module, wherein the base-voltage generation module charges a capacitor by a constant current to result in a terminal voltage of the capacitor, obtains a high-frequency switching signal based on comparison between the terminal voltage of the capacitor and the high-level voltage, and controls a period of the high-frequency switching signal based on comparison between the terminal voltage of the capacitor and the sum of the low-level voltage and the high-level voltage; wherein under the control of the high-frequency switching signal, a capacitor is then charged and discharged based on a reference voltage to generate a base voltage, wherein the base voltage is related to the low-frequency PWM signal only in terms of a duty cycle of the low-frequency PWM signal; and a dimming-signal generation module, connected to an output of the base-voltage generation module, wherein the dimming-signal generation module outputs the base voltage as a dimming signal when the base voltage is greater than a predetermined voltage, and outputs a new PWM signal as the dimming signal when the base voltage is less than the predetermined voltage, wherein the new PWM signal has a magnitude equal to that of the predetermined voltage and a frequency independent of the low-frequency PWM signal, wherein the new PWM signal has an average value equal to that of the base voltage.

Optionally, the low-level-voltage generation module comprises:
- a rising-edge detection unit, which generates a low-level-counting termination signal when a corresponding rising edge of the low-frequency PWM signal arrives;
- a first counter, whose clock input is connected to the high-frequency clock signal and whose reset terminal is connected to an output of the rising-edge detection unit, wherein the first counter counts cycles of the high-frequency clock signal during the low level duration of the low-frequency PWM signal to obtain a low-level count, and performs a reset operation to complete the low-level counting operation when the low-level-counting termination signal is effective, and initiates a high-level counting operation at the same time as the reset operation.
- a first digital-to-analog converter, connected to an output of the first counter, wherein the first digital-to-analog converter performs digital-to-analog conversion on a numerical value of the low level duration that is output from the first counter;
- a low-level-voltage latching unit, connected to an output of the first digital-to-analog converter, wherein when the low-level-counting termination signal is effective, the low-level-voltage latching unit latches what is output by the first digital-to-analog converter to obtain the low-level voltage;

Optionally, the high-level-voltage generation module comprises:
- a falling-edge detection unit, which generates a high-level-counting termination signal when a falling edge of the low-frequency PWM signal arrives;
- a second counter, whose clock input is connected to the high-frequency clock signal and whose reset terminal is connected to an output of the falling-edge detection unit, wherein the second counter counts cycles of the high-frequency clock signal during the high level duration of the low-frequency PWM signal to obtain a high-level count, and performs a reset operation to complete the high-level counting operation when the high-level-counting termination signal is effective, and initiates a low-level counting operation at the same time as the reset operation;
- a second digital-to-analog converter, connected to an output of the second counter, wherein the second digital-to-analog converter performs digital-to-analog conversion on a numerical value of the high level duration that is output from the second counter;
- a high-level-voltage latching unit, connected to an output of the second digital-to-analog converter, wherein when the high-level-counting termination signal is effective, the high-level-voltage latching unit latches what is output by the second digital-to-analog converter to obtain the high-level voltage;
- wherein the first counter is identical to the second counter, and the first digital-to-analog converter is identical to the second digital-to-analog converter.

Optionally, the low-level-voltage generation module and the high-level-voltage generation module share a counter and a digital-to-analog converter, the shared counter serves as both the first counter and the second counter, and the shared digital-to-analog converter serves as both the first digital-to-analog converter and the second digital-to-analog converter; wherein the reset terminal of the shared counter is connected to both the output of the rising-edge detection unit and the output of the falling-edge detection unit via a first adder, the output of the shared counter is connected to an input of the shared digital-to-analog converter, an output of the shared digital-to-analog converter is connected to both an input of the low-level-voltage latching unit and an input of the high-level-voltage latching unit.

Optionally, the low-level-voltage latching unit comprises a first switch and a first capacitor, wherein a control terminal of the first switch is connected to the output of the rising-edge detection unit, a first connection terminal of the first switch is connected to the output of the shared digital-to-analog converter, a second connection terminal of the first switch is connected to a first terminal of the first capacitor and serves as the output of the low-level-voltage generation module, and a second terminal of the first capacitor is grounded;

wherein the high-level-voltage latching unit comprises a second switch and a second capacitor, wherein a control terminal of the second switch is connected to the output of the falling-edge detection unit, a first connection terminal of the second switch is connected to the output of the shared digital-to-analog converter, a second connection terminal of the second switch is connected to a first terminal of the second capacitor and serves as the output of the high-level-voltage generation module, and a second terminal of the second capacitor is grounded.

Optionally, the LED dimming circuit further comprises:
- a low-level-voltage clearing module, connected to both terminals of the first capacitor, wherein the low-level-voltage clearing module clears the low-level voltage latched in the first capacitor when the low-frequency PWM signal is a high level and the shared counter overflows; and
- a high-level-voltage clearing module, connected to both terminals of the second capacitor, wherein the high-level-voltage clearing module clears the high-level voltage latched in the second capacitor when the low-frequency PWM signal is a low level and the shared counter overflows.

Optionally, the low-level-voltage clearing module comprises:
- a high-level detection unit, which generates a high-level detection signal when the low-frequency PWM signal is a high level;
- a first AND gate, one input of which is connected to the output of the high-level detection unit and the other input of which is connected to an overflow terminal of the shared counter, wherein the first AND gate generates a low-level-voltage-clearing drive signal when the high-level detection signal is effective and the shared counter overflows;
- a first MOS transistor, wherein the first MOS transistor has a gate connected to an output of the first AND gate, a drain connected to one terminal of the first capacitor and a source connected to the other terminal of the first capacitor, wherein the first MOS transistor conducts when the low-level-voltage-clearing drive signal is effective, in order to clear the low-level voltage latched in the first capacitor.

Optionally, the high-level-voltage clearing module comprises:
- a low-level detection unit, which generates a low-level detection signal when the low-frequency PWM signal is a low level;
- a second AND gate, one input of which is connected to the output of the low-level detection unit and the other input of which is connected to an overflow terminal of the shared counter, wherein the second AND gate generates a high-level-voltage-clearing drive signal when the low-level detection signal is effective and the shared counter overflows; and a second MOS transistor, wherein the second MOS transistor has a gate connected to an output of the second AND gate, a drain connected to one terminal of the second capacitor and a source connected to the other terminal of the second capacitor, wherein the second MOS transistor conducts when the high-level-voltage-clearing drive signal is effective, in order to clear the high-level voltage latched in the second capacitor.

Optionally, the low-level-voltage generation module further comprises:

an auxiliary low-level transmission unit, connected between the shared digital-to-analog converter and the first capacitor, wherein the auxiliary low-level transmission unit transmits what is output by the shared digital-to-analog converter to the first capacitor when the low-level detection signal is effective;

Optionally, the high-level-voltage generation module further comprises:

an auxiliary high-level transmission unit, connected between the shared digital-to-analog converter and the second capacitor, wherein the auxiliary high-level transmission unit transmits what is output by the shared digital-to-analog converter to the second capacitor when the high-level detection signal is effective.

Optionally, the auxiliary low-level transmission unit comprises a third switch and a first diode, wherein a control terminal of the third switch is connected to the output of the low-level detection unit, a first connection terminal of the third switch is connected to the output of the shared digital-to-analog converter, a second connection terminal of the third switch is connected to a positive terminal of the first diode, a negative terminal of the first diode is connected to one terminal of the first capacitor.

Optionally, the auxiliary high-level transmission unit comprises a fourth switch and a second diode, wherein a control terminal of the fourth switch is connected to the output of the high-level detection unit, a first connection terminal of the fourth switch is connected to the output of the digital-to-analog converter, a second connection terminal of the fourth switch is connected to a positive terminal of the second diode, a negative terminal of the second diode is connected to one terminal of the second capacitor.

Optionally, the base-voltage generation module comprises:

a low-level-voltage caching unit, connected to the output of the low-level-voltage generation module, for caching the low-level voltage;

a high-level-voltage caching unit, connected at the output of the high-level-voltage generation module, for caching the high-level voltage;

a constant current source and a third capacitor, wherein a current input of the constant current source is connected to a supply voltage, a current output of the constant current source is connected to one terminal of the third capacitor and the other terminal of the third capacitor is grounded, wherein the constant current source charges the third capacitor by a constant current provided by the constant current source to produce a capacitor terminal voltage at one terminal of the third capacitor;

a first comparator, which has an in-phase input connected to one terminal of the third capacitor and an inverting input connected to an output of the high-level-voltage caching unit, wherein the first comparator compares the capacitor terminal voltage with the high-level voltage and obtains the high-frequency switching signal based on a result of the comparison;

a second comparator whose in-phase input is connected to one terminal of the third capacitor and whose inverting input is connected to the output of the low-level-voltage caching unit and the output of the high-level-voltage caching unit via a second adder, for comparing the capacitor terminal voltage with the sum of the low-level voltage and the high-level voltage and generating a discharge drive signal when the capacitor terminal voltage is not less than the sum of the low-level voltage and the high-level voltage;

a third MOS transistor, which has a gate connected to the output of the second comparator, a drain connected to one terminal of the third capacitor and a source connected to the other terminal of the third capacitor, wherein the third MOS transistor conducts when the discharge drive signal is effective in order to perform a discharge operation on the third capacitor and then to start a new cycle after the discharge operation ends, thereby controlling a period of the high-frequency switching signal; and a base-voltage generation unit, connected to an output of the first comparator, wherein the base-voltage generation unit charges and discharges a capacitor to generate the base voltage based on the reference voltage, under the control of the high-frequency switching signal.

Optionally, the base-voltage generation unit comprises: a first resistor, a second resistor, a fifth switch, a fourth capacitor, and an operational amplifier, wherein one terminal of the first resistor is connected to the reference voltage, the other terminal of the first resistor is connected to a first connection terminal of the fifth switch and to one terminal of the second resistor, a control terminal of the fifth switch is connected to the output of the first comparator, a second connection terminal of the fifth switch is grounded, the other terminal of the second resistor is connected to one terminal of the fourth capacitor and an in-phase input of the operational amplifier, the other terminal of the fourth capacitor is grounded, an inverting input of the operational amplifier is connected to an output of the operational amplifier and serves as an output of the base-voltage generation module.

Optionally, the dimming-signal generation module comprises:

a switch-control-signal generation unit, which generates an analog-output switch control signal when the base voltage is greater than the predetermined voltage, and generates a PWM-output switch control signal when the base voltage is less than the predetermined voltage, based on the high-level count of the low-frequency PWM signal and a count of cycles of the high-frequency clock signal by a loop counter; and an output control unit, connected to the output of the base-voltage generation module and an output of the switch-control-signal generation unit, wherein the output control unit outputs the base voltage as a dimming signal under the control of the analog-output switch control signal when the base voltage is greater than the predetermined voltage; and when the base voltage is less than the predetermined voltage, the output control unit outputs the new PWM signal as the dimming signal under the control of the PWM-output switch control signal.

Optionally, the switch-control-signal generation unit comprises:
- a register, which latches the high-level count in the high-level-voltage generation module when a falling edge of the low-frequency PWM signal arrives;
- a loop counter, whose clock input is connected to the high-frequency clock signal, which performs loop counting of cycles of the high-frequency clock signal;
- an exclusive-OR gate, one input of which is connected to an output of the register and the other input of which is connected to an output of the loop counter, used for generating a clock-trigger signal when the high-level count latched in the register coincides with the count of cycles of the high-frequency clock signal by the loop counter;
- a third AND gate, one input of which is connected to an overflow terminal of the loop counter via a first inverter, and another input of which is connected to a control signal output of the output control unit, for generating a setting-trigger signal when the base voltage is greater than the predetermined voltage or when the loop counter overflows; and
- a D flip-flop, which has a clock input connected to an output of the exclusive-OR gate, a data terminal connected to a low level, a setting terminal connected to an output of the third AND gate, and an output used as an output of the switch-control-signal generation unit, wherein the D flip-flop generates a switch-on signal when the setting-trigger signal is effective and a switch-off signal when the clock-trigger signal is effective.

Optionally, the output control unit comprises: a second inverter, a third comparator, a sixth switch, a seventh switch, and an eighth switch, wherein an in-phase input of the third comparator is connected to the output of the base-voltage generation module and a first connection terminal of the sixth switch, wherein an inverting input of the third comparator is connected to a first connection terminal of the seventh switch and the predetermined voltage, wherein an output of the third comparator is connected to an input of the second inverter and a control terminal of the sixth switch, wherein an output of the second inverter is connected to a control terminal of the seventh switch and serves as the control signal output of the output control unit, wherein a second connection terminal of the sixth switch is connected to a second connection terminal of the seventh switch and a first connection terminal of the eighth switch, wherein a control terminal of the eighth switch is connected to an output terminal of the switch-control-signal generation unit, and a second connection terminal of the eighth switch serves as a dimming-signal output terminal of the dimming-signal generation module.

As described above, the LED dimming circuit of the present invention has the following beneficial effects:

In the LED dimming circuit described in the present invention, when the base voltage is greater than the predetermined voltage, an analog signal related to an input low-frequency PWM signal only in terms of its duty cycle is output as the dimming signal, and when the base voltage is less than the predetermined voltage, a new PWM signal is output as the dimming signal, which has a frequency of $$f_{new\_PWM} = \frac{F_{CLK}}{2^{Counter 2}}$$

and a reduced amplitude of $$\frac{2^{Counter 2}}{2^{Counter 1}} * V\,ref,$$

and the average value of the new PWM signal is the same as that of the base voltage, so as to control an external dimming current.

The dimming signal described in the present invention is related to only the duty cycle of the input low-frequency PWM signal, thus loosening the requirements for the microcontroller that generates the dimming signal.

In the present invention, an analog signal is output as the dimming signal when the LED's output current is large, eliminating the need for large capacitors in the conversion of low-frequency PWM signals to analog signals, thus allowing the output analog signal to respond instantly to the input low-frequency PWM signal, and as a result, the circuit can be integrated inside a chip to simplify peripheral circuits. When the LED's output current is small, a new PWM signal is output as the dimming signal, which has a frequency of $$f_{new\_PWM} = \frac{F_{CLK}}{2^{Counter 2}}$$

and a reduced amplitude of $$\frac{2^{Counter 2}}{2^{Counter 1}} * V\,ref,$$

and the average value of the new PWM signal is the same as that of the base voltage, so as to reduce modulation requirements on the input low-frequency PWM signal; at the same time the frequency of the new PWM signal is independent of that of the input low-frequency PWM signal, and is dependent on the frequency of a high-frequency clock signal and bits of a loop counter, so that the frequency of the new PWM signal is high enough that the human eye no longer sees flickering; therefore, the range of the dimming frequency is no longer as limited, light can be output without strobe, and the new PWM signal's reduced amplitude leads to reduced audio noise.

When there are multiple LED lights connected in parallel, as long as sampling frequencies of the corresponding high-frequency clock signals of the multiple LED lights are consistent, the multiple LED lights will have an excellent dimming consistency, even when they are dimmed to a low brightness.

Figure 1:
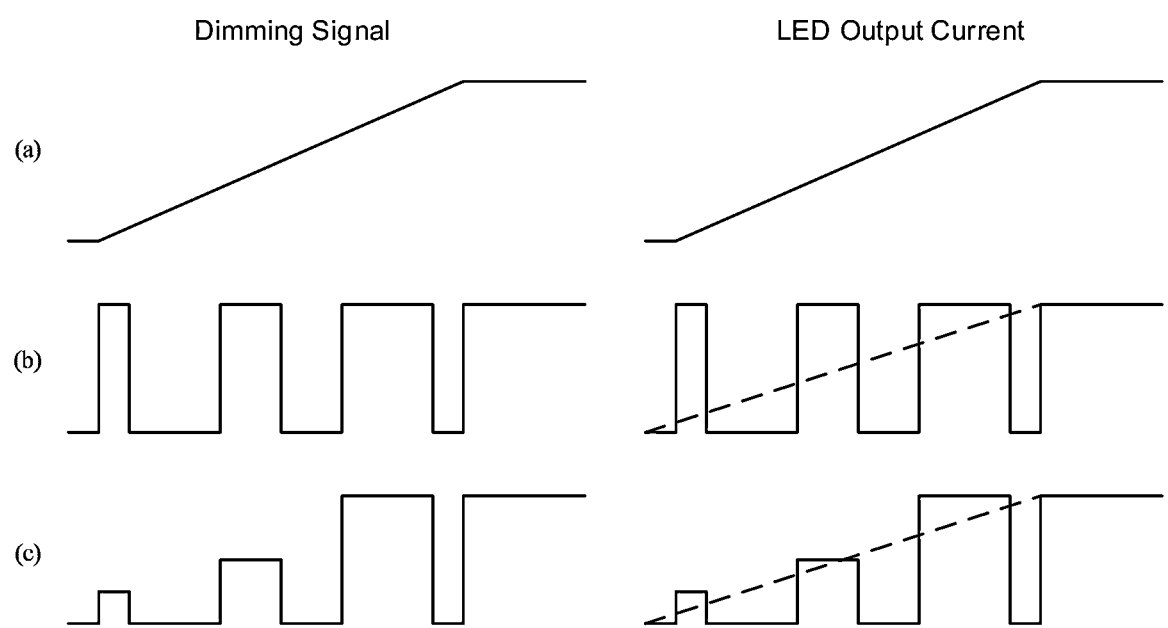
FIG. 1 shows (a) a waveform of an LED's output current changing with a dimming signal, in an existing analog dimming method, (b) a waveform of an LED's output current changing with a dimming signal, in an existing PWM dimming method, and (c) a waveform of an LED's output current changing with a dimming signal, in an existing dimming method combining analog dimming and PWM dimming.

REFERENCE NUMERALS 100 low-level-voltage generation module
101 rising-edge detection unit
102 low-level-voltage latching unit
103 auxiliary low-level transmission unit
200 high-level-voltage generation module
201 falling-edge detection unit
202 high-level-voltage latching unit
203 auxiliary high-level transmission unit
300 low-level-voltage clearing module
301 high-level detection unit
400 high-level-voltage clearing module
401 low-level detection unit
500 base-voltage generation module
501 low-level-voltage caching unit
502 high-level-voltage caching unit
503 base-voltage generation unit
600 dimming-signal generation module
601 switch-control-signal generation unit
602 output control unit

DETAILED DESCRIPTION

The following describes the implementation of the present invention through specific examples, and those skilled in the art can easily understand other advantages and effects of the present invention from the content disclosed in this specification. The present invention can also be implemented or applied through other different specific embodiments. Various details in this specification can also be modified or changed based on different viewpoints and applications without departing from the spirit of the present invention.

Figure 2:
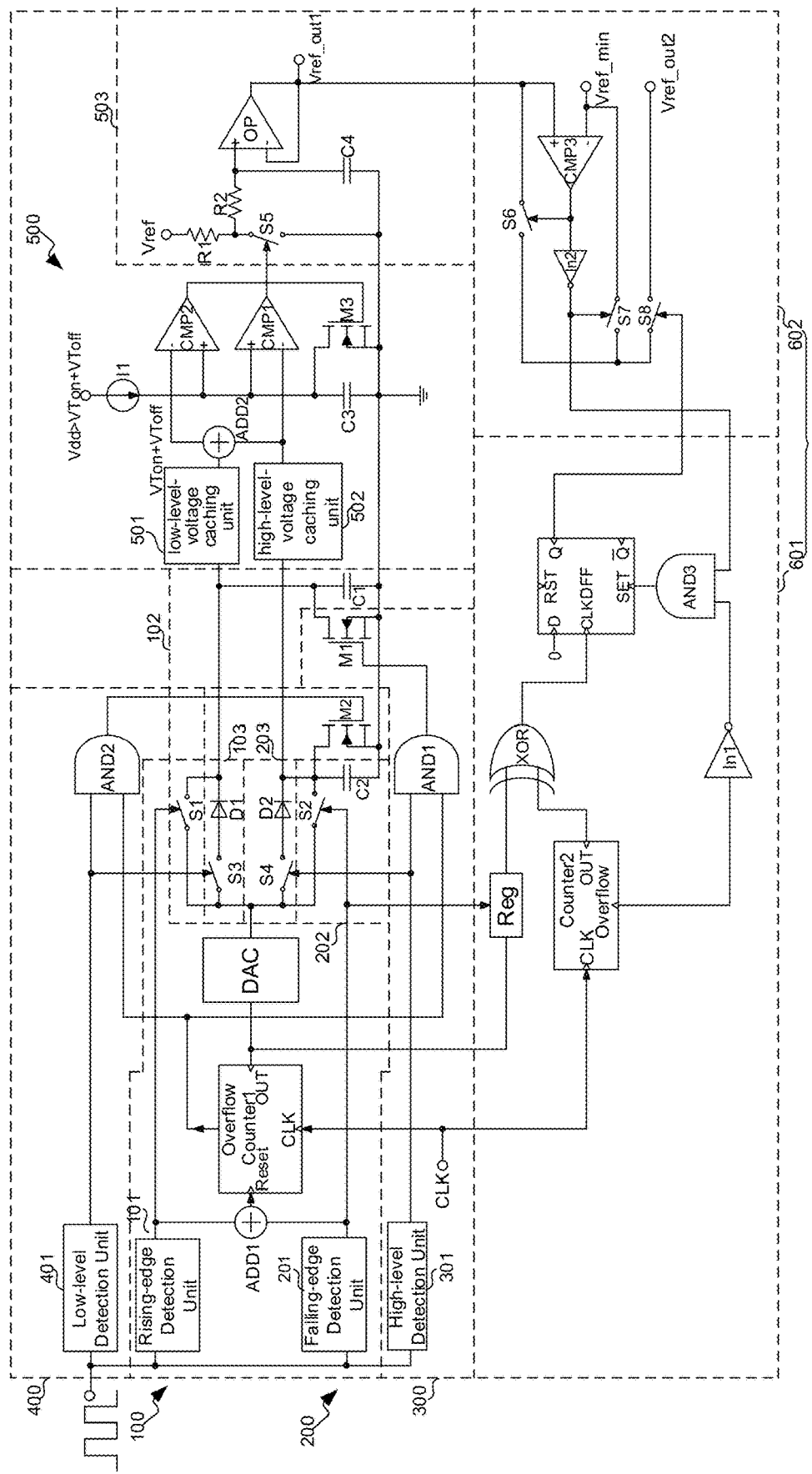
FIG. 2 shows a circuit diagram of an LED dimming circuit of the present invention.
Figure 3:
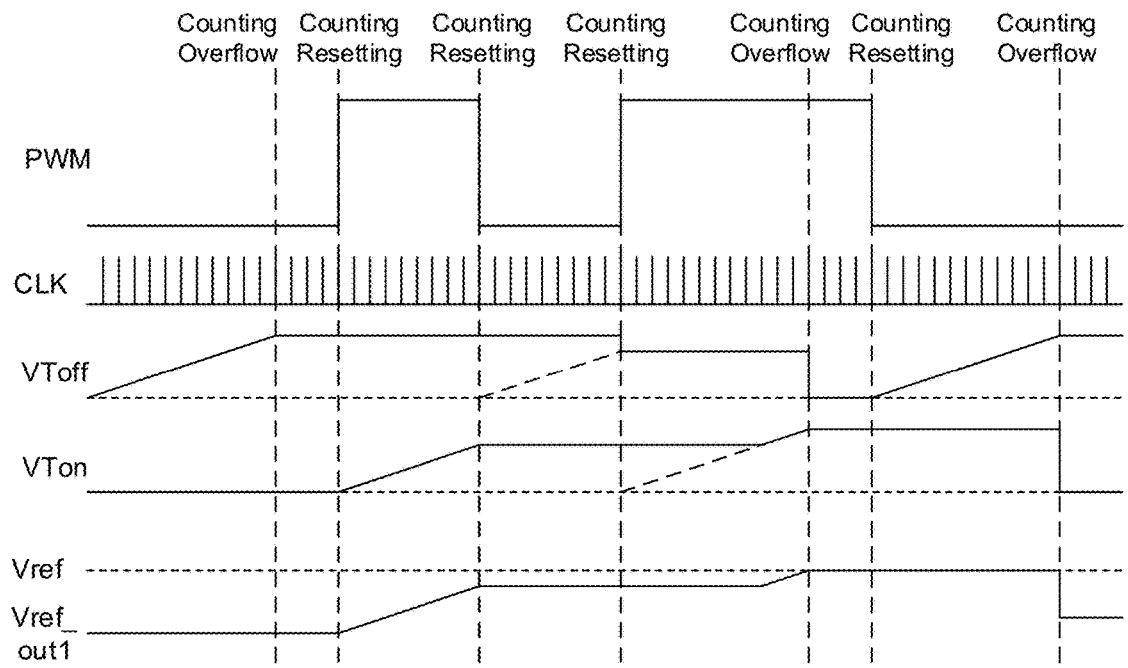
FIG. 3 shows waveform diagrams of several signals of an LED dimming circuit when the circuit generates a base voltage according to one embodiment of the present invention.
Figure 4:
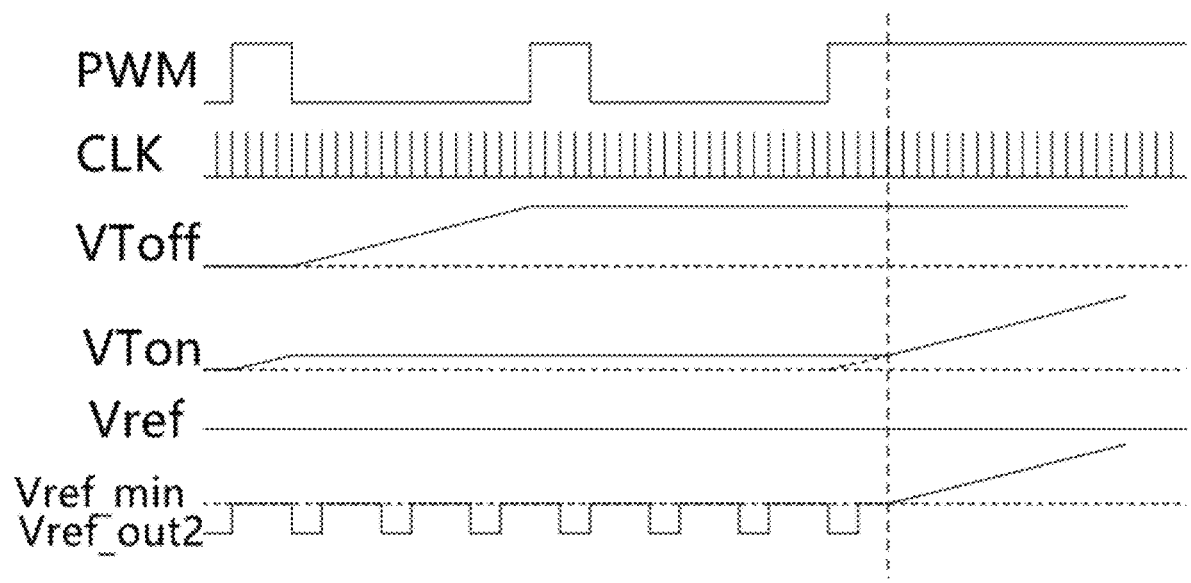
FIG. 4 shows waveform diagrams of several signals of an LED dimming circuit when the circuit has a high dimming ratio.

Refer to FIGS. 2 to 4. It should be noted that the drawings provided in this disclosure only illustrate the basic concept of the present invention in a schematic way, so the drawings only show the components related to the present invention. The drawings are not necessarily drawn according to the number, shape and size of the components in actual implementation; during the actual implementation, the type, quantity and proportion of each component can be changed as needed, and the components' layout may also be more complicated.

As shown in FIG. 2, one embodiment of the present invention provides an LED dimming circuit, and the LED dimming circuit comprises:
  a low-level-voltage generation module 100, which performs a low-level counting comprising counting cycles of a high-frequency clock signal CLK during a low level duration of a low-frequency PWM signal in order to measure the low level duration Toff, after which the low level duration Toff is converted to obtain a low-level voltage VToff; the low-level voltage VToff has a value corresponding to the low level duration Toff;
  a high-level-voltage generation module 200, which performs high-level counting comprising counting cycles of the high-frequency clock signal CLK during a high level duration of the low-frequency PWM signal in order to measure the high level duration Ton, after which the high level duration Ton is converted to obtain a high-level voltage VTon, wherein the high-level voltage VTon has a value corresponding to the high level duration Ton;
  a base-voltage generation module 500, connected to an output of the low-level-voltage generation module 100 and to an output of the high-level-voltage generation module 200, wherein the base-voltage generation module 500 charges a capacitor by a constant current to result in a terminal voltage of the capacitor, obtains a high-frequency switching signal based on comparison between the terminal voltage of the capacitor and the high-level voltage VTon, and controls a period of the high-frequency switching signal based on comparison between the terminal voltage of the capacitor and the sum of the low-level voltage VToff and the high-level voltage VTon; wherein under the control of the high-frequency switching signal, the capacitor is then charged and discharged based on a reference voltage Vref to generate a base voltage Vref_out1, wherein the base voltage Vref_out1 is related to the low-frequency PWM signal only in terms of a duty cycle of the low-frequency PWM signal; and
  a dimming signal generation module 600, connected to an output of the base-voltage generation module 500, wherein the dimming signal generation module 600 outputs the base voltage Vref_out1 as a dimming signal when the base voltage Vref_out1 is greater than a predetermined voltage Vref_min, and outputs a new PWM signal as the dimming signal when the base voltage Vref_out1 is less than the predetermined voltage Vref_min, wherein the new PWM signal has a magnitude equal to that of the predetermined voltage Vref_min and a frequency independent of the low-frequency PWM signal, wherein the new PWM signal has an average value equal to that of the base voltage Vref_out1.

As an example, as shown in FIG. 2, the low-level-voltage generation module 100 comprises:
  a rising-edge detection unit 101 which generates a low-level-counting termination signal when a corresponding rising edge of the low-frequency PWM signal arrives;
  a first counter, whose clock input is connected to the high-frequency clock signal CLK and whose reset terminal is connected to an output of the rising-edge detection unit 101, wherein the first counter counts cycles of the high-frequency clock signal CLK during the low level duration of the low-frequency PWM signal to obtain a low level count, and performs a reset operation to complete the low-level counting when the low-level-counting termination signal is effective, and initiates a high-level counting at the same time as the reset operation.
  a first digital-to-analog converter, connected to an output of the first counter, wherein the first digital-to-analog converter performs digital-to-analog conversion on a numerical value of the low level duration Toff that is output from the first counter; and
  a low-level-voltage latching unit 102, connected to an output of the first digital-to-analog converter, wherein when the low-level-counting termination signal is effective, the low-level-voltage latching unit latches what is output by the first digital-to-analog converter to obtain the low-level voltage VToff;

The high-level-voltage generation module 200 comprises:
  a falling-edge detection unit 201 which generates a high-level-counting termination signal when a falling edge of the low-frequency PWM signal arrives;
  a second counter, whose clock input is connected to the high-frequency clock signal CLK and whose reset terminal is connected to an output of the falling-edge detection unit 201, wherein the second counter counts cycles of the high-frequency clock signal CLK during the high level duration of the low-frequency PWM signal to obtain a high-level count, and performs a reset operation to complete the high-level counting operation when the high-level-counting termination signal is effective, and initiates a low-level counting operation at the same time as the reset operation;

a second digital-to-analog converter, connected to an output of the second counter, wherein the second digital-to-analog converter performs digital-to-analog conversion on a numerical value of the high level duration Ton that is output from the second counter; and a high-level-voltage latching unit 202, connected to an output of the second digital-to-analog converter, wherein when the high-level-counting termination signal is effective, the high-level-voltage latching unit latches what is output by the second digital-to-analog converter to obtain the high-level voltage VTon;

In one example, the first counter is identical to the second counter, and the first digital-to-analog converter is identical to the second digital-to-analog converter. It is to be noted that "the first counter is identical to the second counter, and the first digital-to-analog converter is identical to the second digital-to-analog converter" means that the structures and parameters of the two devices are identical.

Optionally, the low-level-voltage generation module 100 and the high-level-voltage generation module 200 share a counter Counter1 and a digital-to-analog converter DAC, the shared counter Counter1 is a resettable counter, and serves as both the first counter and the second counter, and the shared digital-to-analog converter DAC serves as both the first digital-to-analog converter and the second digital-to-analog converter; wherein the reset terminal of the shared counter Counter1 is connected to both the output of the rising-edge detection unit 101 and the output of the falling-edge detection unit 201 via a first adder ADD1, the output of the shared counter Counter1 is connected to an input of the shared digital-to-analog converter DAC, an output of the shared digital-to-analog converter DAC is connected to both an input of the low-level-voltage latching unit 102 and an input of the high-level-voltage latching unit 202 (as shown in FIG. 2).

Specifically, the rising-edge detection unit 101 can be any existing circuit that can achieve rising-edge detection of PWM signals, and the falling-edge detection unit 201 can be any existing circuit that can achieve falling-edge detection of PWM signals.

Specifically, as shown in FIG. 2, the low-level-voltage latching unit 102 comprises a first switch S1 and a first capacitor C1, wherein a control terminal of the first switch S1 is connected to the output of the rising-edge detection unit 101, a first connection terminal of the first switch S1 is connected to the output of the shared digital-to-analog converter DAC, a second connection terminal of the first switch S1 is connected to a first terminal of the first capacitor C1 and serves as the output of the low-level-voltage generation module 100, and a second terminal of the first capacitor C1 is grounded; the high-level-voltage latching unit 202 comprises a second switch S2 and a second capacitor C2, wherein a control terminal of the second switch S2 is connected to the output of the falling-edge detection unit 201, a first connection terminal of the second switch S2 is connected to the output of the shared digital-to-analog converter DAC, a second connection terminal of the second switch S2 is connected to a first terminal of the second capacitor C2 and serves as the output of the high-level-voltage generation module 200, and a second terminal of the second capacitor C2 is grounded.

In this example, the first counter Counter1 is used to count cycles of the high-frequency clock signal CLK within a low level duration of the low-frequency PWM signal; then the digital-to-analog conversion of the output of the first counter Counter1 is performed via the digital-to-analog converter DAC; a rising edge of the low-frequency PWM signal is used as a trigger signal to trigger the reset terminal of the first counter Counter1 to terminate the low-level counting, and the rising edge of the low-frequency PWM signal is used as a switch control signal to control the first switch S1 to be turned on, in order to latch the output of the digital-to-analog converter DAC into the first capacitor C1 to obtain the low-level voltage VToff. Similarly, in some examples the first counter Counter1 also severs as the second counter, and is used to count cycles of the high-frequency clock signal CLK within a high level duration of the low-frequency PWM signal, in which case, Counter1 in subsequent formulas represents a final reading of the counter which serves as both the first counter and the second counter; then the digital-to-analog conversion of the output of the first counter Counter1 is performed via the digital-to-analog converter DAC; a falling edge of the low-frequency PWM signal is used as a trigger signal to trigger the reset terminal of the first counter Counter1 to terminate the high-level counting, and the falling edge of the low-frequency PWM signal is also used as a switch control signal to control the second switch S2 to be turned on, in order to latch the output of the digital-to-analog converter DAC into the second capacitor C2 to obtain the high-level voltage VTon.

As an example, as shown in FIG. 2, the LED dimming circuit further comprises:

a low-level-voltage clearing module 300, connected to both terminals of the first capacitor C1, wherein the low-level-voltage clearing module 300 clears the low-level voltage VToff latched in the first capacitor C1 when the low-frequency PWM signal is a high level and the first counter Counter1 overflows; and a high-level-voltage clearing module 400, connected to both terminals of the second capacitor C2, wherein the high-level-voltage clearing module 400 clears the high-level voltage VTon latched in the second capacitor C2 when the low-frequency PWM signal is a low level and the first counter Counter1 (i.e., the second counter) overflows.

Specifically, as shown in FIG. 2, the low-level-voltage clearing module 300 comprises:

a high-level detection unit 301, which generates a high-level detection signal when the low-frequency PWM signal is a high level;

a first AND gate AND1, one input of which is connected to the output of the high-level detection unit 301 and the other input of which is connected to an overflow terminal of the first counter Counter1, wherein the first AND gate AND1 generates a low-level-voltage-clearing drive signal when the high-level detection signal is effective and the first counter Counter1 overflows; and a first MOS transistor M1 with its gate connected to an output of the first AND gate AND1, its drain connected to one terminal of the first capacitor C1 and its source connected to the other terminal of the first capacitor C1, wherein the first MOS transistor M1 conducts when the low-level-voltage-clearing drive signal is effective, in order to clear the low-level voltage VToff latched in the first capacitor C1.

The high-level-voltage clearing module 400 comprises:
- a low-level detection unit 401 for generating a low-level detection signal when the low-frequency PWM signal is a low level;
- a second AND gate AND2, one input of which is connected to the output of the low-level detection unit 401 and the other input of which is connected to an overflow terminal of the first counter Counter1, wherein the second AND gate AND2 generates a high-level-voltage-clearing drive signal when the low-level detection signal is effective and the first counter Counter1 overflows; and
- a second MOS transistor M2 with its gate connected to an output of the second AND gate AND2, its drain connected to one terminal of the second capacitor C2, and its source connected to the other terminal of the second capacitor C2, wherein the second MOS transistor M2 conducts when the high-level-voltage-clearing drive signal is effective, in order to clear the high-level voltage VTon latched in the second capacitor C2.

In this example, the frequency of the high-frequency clock signal CLK and the number of bits of the first counter Counter1 determine a maximum length of time $$T\_max = \frac{2^{Counter1}}{F_{CLK}}$$

for the first counter Counter1 to perform one low-level counting operation, or one high-level counting operation on the low-frequency PWM signal; when the length of time of one continuous high-level counting operation by the first counter Counter1 on the low-frequency PWM signal exceeds T_max, the overflow terminal of the first counter Counter1 produces an overflow signal, which, along with a high-level detection signal generated by the high-level detection unit 301, passes through the first AND gate AND1 and the first MOS transistor M1 and then clears the low-level voltage VToff latched in the first capacitor C1; when the length of time of one continuous low-level counting operation by the first counter Counter1 on the low-frequency PWM signal exceeds T_max, the overflow terminal of the first counter Counter1 produces an overflow signal, which, along with a low-level detection signal generated by the low-level detection unit 401, passes through the second AND gate AND2 and the second MOS transistor M2 and then clears the high-level voltage VTon latched in the second capacitor C2; This design prevents a situation where the circuit's output stays at VTon_max+VToff_max when the circuit is turned on or off, because the low-frequency PWM signal only has one rising edge, or only one falling edge. It should be noted that the high-level detection unit 301 can be any existing circuit that can achieve high level detection of PWM signals, and the low-level detection unit 401 can be any existing circuit that can achieve low level detection of PWM signals.

As an example, as shown in FIG. 2, the low-level-voltage generation module 100 further comprises:
- an auxiliary low-level transmission unit 103, connected between the shared digital-to-analog converter DAC and the first capacitor C1, wherein the auxiliary low-level transmission unit 103 transmits what is output by the shared digital-to-analog converter DAC to the first capacitor C1 when the low-level detection signal is effective;

The high-level-voltage generation module 200 further comprises:
- an auxiliary high-level transmission unit 203, connected between the shared digital-to-analog converter DAC and the second capacitor C2, wherein the auxiliary high-level transmission unit 203 transmits what is output by the shared digital-to-analog converter DAC to the second capacitor C2 when the high-level detection signal is effective.

Specifically, as shown in FIG. 2, the auxiliary low-level transmission unit 103 comprises: a third switch S3 and a first diode D1, wherein a control terminal of the third switch S3 is connected to the output of the low-level detection unit 401, a first connection terminal of the third switch S3 is connected to the output of the shared digital-to-analog converter DAC, a second connection terminal of the third switch S3 is connected to a positive terminal of the first diode D1, a negative terminal of the first diode D1 is connected to one terminal of the first capacitor C1; the auxiliary high-level transmission unit 203 comprises: a fourth switch S4 and a second diode D2, wherein a control terminal of the fourth switch S4 is connected to the output of the high-level detection unit 301, a first connection terminal of the fourth switch S4 is connected to the output of the shared digital-to-analog converter DAC, a second connection terminal of the fourth switch S4 is connected to a positive terminal of the second diode D2, a negative terminal of the second diode D2 is connected to one terminal of the second capacitor C2.

In this example, the low-level detection signal generated by the low-level detection unit 401 is used to control the third switch S3 to conduct, so that the output of the shared digital-to-analog converter DAC can be latched into the first capacitor C1 through the first diode D1 even if there is no rising edge of the low-frequency PWM signal as a switch control signal to control the first switch S1 to conduct; similarly, the high-level detection signal generated by the high-level detection unit 301 is used to control the fourth switch S4 to conduct, so that the output of the digital-to-analog converter DAC can be latched into the second capacitor C2 through the second diode D2 even if there is no falling edge of the low-frequency PWM signal as a switch control signal to control the second switch S2 to conduct.

As an example, as shown in FIG. 2, the base-voltage generation module 500 comprises:
- a low-level-voltage caching unit 501, connected to the output of the low-level-voltage generation module 100, for caching the low-level voltage VToff;
- a high-level-voltage caching unit 502, connected to the output of the high-level-voltage generation module 200, for caching the high-level voltage VTon;
- a constant current source 11 and a third capacitor C3, wherein a current input of the constant current source 11 is connected to a supply voltage Vdd, a current output of the constant current source 11 is connected to one terminal of the third capacitor C3 and the other terminal of the third capacitor C3 is grounded, wherein the constant current source 11 charges the third capacitor C3 by a constant current provided by the constant current source 11 to produce a capacitor terminal voltage VC3 at one terminal of the third capacitor C3;
- a first comparator CMP1, which has an in-phase input connected to one terminal of the third capacitor C3 and an inverting input connected to an output of the highlevel-voltage caching unit 502, wherein the first comparator CMP1 compares the capacitor terminal voltage VC3 with the high-level voltage VTon and obtains the high-frequency switching signal based on a result of the comparison;

a second comparator CMP2, which has an in-phase input connected to one terminal of the third capacitor C3 and an inverting input connected to an output of the low-level-voltage caching unit 501 and the output of the high-level-voltage caching unit 502 via a second adder ADD2, wherein the second comparator CMP2 compares the capacitor terminal voltage VC3 with the sum of the low-level voltage VToff and the high-level voltage VTon, and generates a discharge drive signal when the capacitor terminal voltage VC3 is not less than the sum of the low-level voltage VToff and the high-level voltage VTon;

a third MOS transistor M3, which has a gate connected to the output of the second comparator CMP2, a drain connected to one terminal of the third capacitor C3 and a source connected to the other terminal of the third capacitor C3, wherein the third MOS transistor M3 conducts when the discharge drive signal is effective, in order to perform a discharge operation on the third capacitor C3 and then to start a new cycle after the discharge operation ends, thereby controlling a period of the high-frequency switching signal; and a base-voltage generation unit 503, connected to an output of the first comparator CMP1, wherein the base-voltage generation unit 503 charges and discharges a capacitor to generate the base voltage Vref_out1 based on the reference voltage Vref, under the control of the high-frequency switching signal.

Specifically, the low-level-voltage caching unit 501 and the high-level-voltage caching unit 502 can be any the existing circuits that can implement a voltage caching function.

Specifically, as shown in FIG. 2, the base-voltage generation unit 503 includes: a first resistor R1, a second resistor R2, a fifth switch S5, a fourth capacitor C4, and an operational amplifier OP, wherein one terminal of the first resistor R1 is connected to the reference voltage Vref, the other terminal of the first resistor R1 is connected to a first connection terminal of the fifth switch S5 and to one terminal of the second resistor R2, a control terminal of the fifth switch S5 is connected to the output of the first comparator CMP1, a second connection terminal of the fifth switch S5 is grounded, the other terminal of the second resistor R2 is connected to one terminal of the fourth capacitor C4 and an in-phase input of the operational amplifier OP, the other terminal of the fourth capacitor C4 is grounded, an inverting input of the operational amplifier OP is connected to an output of the operational amplifier OP and serves as an output of the base-voltage generation module 500.

In this example, the low-level voltage VToff and the high-level voltage VTon are used to obtain a high-frequency switching signal through the joint action of the constant current source 11, the third capacitor C3, the first comparator CMP1, the second comparator CMP2 and the third MOS transistor M3; wherein the result of the comparison between the capacitor terminal voltage and the high-level voltage using the first comparator CMP1 is used to control the fifth switch S5, thereby determining the high level of the high-frequency switching signal; wherein the result of comparing the sum of the low-level voltage and the high-level voltage with the capacitor terminal voltage by the second comparator CMP2 is used to control the third MOS transistor M3, thereby determining the period of the high-frequency switching signal; after that, the high-frequency switching signal controls the fifth switch S5 to turn on or off to obtain a base voltage Vref_out1, that is nearly a DC voltage, at one terminal of the fourth capacitor C4, and then, through the operational amplifier OP, isolated output of the base voltage Vref_out1 is achieved. Specifically: the constant current source 11 and the third capacitor C3 determine a minimum switching signal frequency $$f_{min} = \frac{I1}{C3 * Vdd}$$

of the base-voltage generation module 500; when the capacitor terminal voltage is less than the high-level voltage, i.e., VC3<VTon, the first comparator CMP1 outputs a low level to control the fifth switch S5 to disconnect, at which time the reference voltage Vref charges the fourth capacitor C4 through the first resistor R1 and the second resistor R2, with the charging time being $$\text{Tnew\_on} = \frac{C3 * VTon}{I1};$$

when the capacitor terminal voltage is greater than the high-level voltage and less than the sum of low-level voltage and high-level voltage, i.e. VTon<VC3<VTon+VToff, the first comparator CMP1 outputs a high level to control the fifth switch S5 to conduct, and then the fourth capacitor C4 is discharged to ground through the second resistor R2 and the fifth switch S5; when the capacitor terminal voltage is equal to the sum of low-level voltage and high-level voltage, i.e. VC3=VTon+VToff, the second comparator CMP2 outputs a high level to control the third MOS transistor M3 to conduct and discharge the third capacitor C3, and a new cycle starts after the end of the discharge, with a period of the new cycle being $$Tnew = \frac{C3 * (VTon + VToff)}{I1},$$

and therefore $$\frac{Tnew\_on}{Tnew} = \frac{VTon}{VTon + VToff} = \frac{Ton}{Ton + Toff} = \text{Duty}_{PWM};$$

because the time constants of the second resistor R2 and the fourth capacitor C4 are much larger than the period of the new cycle Tnew of this high-frequency switching signal, so after filtering by the second resistor R2 and the fourth capacitor C4, a base voltage Vref_out1, that is nearly a DC voltage, is output as the system's base voltage to control an external dimming current, and the base voltage Vref_out1 is not related to the frequency of the input low-frequency PWM signal, and is only related to the duty cycle of the input low-frequency PWM signal; as a result, a dimming conversion from a low-frequency PWM signal to an analog signal is achieved (as shown in FIG. 3).

As an example, as shown in FIG. 2, the dimming-signal generation module 600 comprises:

- a switch-control-signal generation unit 601, which generates an analog-output switch control signal when the base voltage Vref_out1 is greater than the predetermined voltage Vref_min, and generates a PWM-output switch control signal when the base voltage Vref_out1 is less than the predetermined voltage Vref_min, based on the high-level count of the low-frequency PWM signal and a count of cycles of the high-frequency clock signal by a loop counter; and
- an output control unit 602, connected to the output of the base-voltage generation module 500 and an output of the switch-control-signal generation unit 601, wherein the output control unit 602 outputs the base voltage Vref_out1 as a dimming signal under the control of the analog-output switch control signal when the base voltage Vref_out1 is greater than the predetermined voltage Vref_min; and when the base voltage Vref_out1 is less than the predetermined voltage Vref_min, the output control unit 602 outputs the new PWM signal as the dimming signal under the control of the PWM-output switch control signal.

Specifically, as shown in FIG. 2, the switch-control-signal generation unit 601 comprises:

- a register Reg, which latches the high-level count in the high-level-voltage generation module when a falling edge of the low-frequency PWM signal arrives;
- a loop counter Counter2, whose clock input is connected to the high-frequency clock signal CLK, which performs loop counting of cycles of the high-frequency clock signal CLK;
- an exclusive-OR gate XOR, one input of which is connected to an output of the register Reg and the other input of which is connected to an output of the loop counter Counter2, used for generating a clock-trigger signal when the high-level count latched in the register Reg coincides with the count of cycles of the high-frequency clock signal CLK by the loop counter Counter2;
- a third AND gate AND3, one input of which is connected to an overflow terminal of the loop counter Counter2 via a first inverter In1, and another input of which is connected to a control signal output of the output control unit 602, for generating a setting-trigger signal when the base voltage Vref_out1 is greater than the predetermined voltage Vref_min or when the loop counter Counter2 overflows; and
- a D flip-flop DFF, which has a clock input connected to an output of the exclusive-OR gate XOR, a data terminal connected to a low level, a setting terminal connected to an output of the third AND gate AND3, and an output used as an output of the switch-control-signal generation unit 601, wherein the D flip-flop DFF generates a switch-on signal when the setting-trigger signal is effective and a switch-off signal when the clock-trigger signal is effective.

Specifically, as shown in FIG. 2, the output control unit 602 comprises: a second inverter In2, a third comparator CMP3, a sixth switch S6, a seventh switch S7, and an eighth switch S8, wherein an in-phase input of the third comparator CMP3 is connected to the output of the base-voltage generation module 500 and a first connection terminal of the sixth switch S6, wherein an inverting input of the third comparator CMP3 is connected to a first connection terminal of the seventh switch S7 and the predetermined voltage Vref_min, wherein an output of the third comparator CMP3 is connected to an input of the second inverter In2 and a control terminal of the sixth switch S6, wherein an output of the second inverter In2 is connected to a control terminal of the seventh switch S7 and serves as the control signal output of the output control unit 602, wherein a second connection terminal of the sixth switch S6 is connected to a second connection terminal of the seventh switch S7 and a first connection terminal of the eighth switch S8, wherein a control terminal of the eighth switch S8 is connected to an output terminal of the switch-control-signal generation unit 601, and a second connection terminal of the eighth switch S8 serves as a dimming-signal output terminal of the dimming-signal generation module 600.

In this example, the predetermined voltage is configured to be $$\mathrm{Vref\_min} = \frac{2^{Counter2}}{2^{Counter1}} * Vref;$$

when Vref_out1>Vref_min, the third comparator CMP3 outputs a high level to control the sixth switch S6 to conduct and the seventh switch S7 to disconnect, while the high level sets the D flip-flop DFF via the second inverter In2 and the third AND gate AND3 to make the D flip-flop DFF output a high level to control the eighth switch S8 to conduct, thereby making Vref_out2=Vref_out1. When Vref_out1<Vref_min, the third comparator CMP3 outputs a low level to control the sixth switch S6 to disconnect and the seventh switch S7 to conduct, and then the loop counter Counter2 generates an overflow signal for the corresponding cycle and sets the D flip-flop DFF through the first inverter In1 and the third gate AND3 to make the D flip-flop DFF output a high level to control the eighth switch S8 to conduct, thereby making Vref_out2=Vref_min; a falling edge of the input low-frequency PWM signal latches the high-level count in the register Reg, and when the count of the loop counter Counter2 coincides with the high-level count latched in the register Reg, the exclusive-OR gate XOR outputs a low-level clock-trigger signal to trigger the D flip-flop, so that the D flip-flop outputs a low level to control the eighth switch S8 to disconnect, at which time Vref_out2=0; therefore, when Vref_out1<Vref_min, a new PWM signal, i.e., Vref_out2, is output as the dimming signal, and the new PWM signal has a frequency of $$f_{new\_PWM} = \frac{F_{CLK}}{2^{Counter2}},$$

a duty cycle of $$\mathrm{Duty}_{new\_PWM} = \frac{Reg}{2^{Counter2}},$$

and a corresponding dimming amplitude of $$\frac{2^{Counter2}}{2^{Counter1}} * Vref,$$

an output current ratio of $$Ipercent = \frac{Reg}{2^{Counter2}} * \frac{2^{Counter2}}{2^{Counter1}} = \frac{Reg}{2^{Counter1}},$$

and a resolution (i.e., minimum dimming ratio) of $$\frac{1}{2^{Counter1}}$$

(as shown in FIG. 4).

In summary, the LED dimming circuit of the present invention has the following beneficial effects: in the LED dimming circuit described in the present invention, when the base voltage is greater than the predetermined voltage, an analog signal related to an input low-frequency PWM signal only in terms of its duty cycle is output as the dimming signal, and when the base voltage is less than the predetermined voltage, a new PWM signal is output as the dimming signal, which has a frequency of $$f_{new\_PWM} = \frac{F_{CLK}}{2^{Counter2}}$$

and a reduced amplitude of $$\frac{2^{Counter2}}{2^{Counter1}} * Vref,$$

and the average value of the new PWM signal is the same as that of the base voltage, so as to control an external dimming current. The dimming signal described in the present invention is related to only the duty cycle of the input low-frequency PWM signal, thus loosening the requirements for the micro-controller that generates the dimming signal. In the present invention, an analog signal is output as the dimming signal when the LED's output current is large, eliminating the need for large capacitors in the conversion of low-frequency PWM signals to analog signals, thus allowing the output analog signal to respond instantly to the input low-frequency PWM signal, and as a result, the circuit can be integrated inside a chip to simplify peripheral circuits. When the LED's output current is small, a new PWM signal is output as the dimming signal, which has a frequency of $$f_{new\_PWM} = \frac{F_{CLK}}{2^{Counter2}}$$

and a reduced amplitude of $$\frac{2^{Counter2}}{2^{Counter1}} * Vref,$$

and the average value of the new PWM signal is the same as that of the base voltage, so as to reduce modulation requirements on the input low-frequency PWM signal; at the same time the frequency of the new PWM signal is independent of that of the input low-frequency PWM signal frequency, and is dependent on the frequency of a high-frequency clock signal and bits of a loop counter, so that the frequency of the new PWM signal is high enough that the human eye no longer sees flickering; therefore, the range of the dimming frequency is no longer as limited, light can be output without strobe, and the new PWM signal's reduced amplitude leads to reduced audio noise. When there are multiple LED lights connected in parallel, as long as sampling frequencies of the corresponding high-frequency clock signals of the multiple LED lights are consistent, the multiple LED lights will have an excellent dimming consistency, even when they are dimmed to a low brightness. Therefore, the present invention effectively overcomes various shortcomings of the prior art and has a high value for industrial application.

The above-mentioned embodiments only exemplarily illustrate the principles and effects of the present invention, but are not used to limit the present invention. Any person skilled in the art may modify or change the above embodiments without violating the spirit and scope of the present invention. Therefore, all equivalent modifications or changes made by those skilled in the art without departing from the spirit and technical concepts disclosed by the present invention should still be covered by the attached claims of the present invention.

What is claimed is:

1. An LED dimming circuit, wherein the LED dimming circuit comprises:
   a low-level-voltage generation module, which performs a low-level counting operation comprising counting cycles of a high-frequency clock signal during a low level duration of a low-frequency PWM signal in order to measure the low level duration, after which the low level duration is converted to obtain a low-level voltage, wherein the low-level voltage has a value corresponding to the low level duration;
   a high-level-voltage generation module, which performs high-level counting operation comprising counting cycles of the high-frequency clock signal during a high level duration of the low-frequency PWM signal in order to measure the high level duration, after which the high level duration is converted to obtain a high-level voltage, wherein the high-level voltage has a value corresponding to the high level duration;
   a base-voltage generation module, connected to an output of the low-level-voltage generation module and to an output of the high-level-voltage generation module, wherein the base-voltage generation module charges a capacitor by a constant current to result in a terminal voltage of the capacitor, obtains a high-frequency switching signal based on comparison between the terminal voltage of the capacitor and the high-level voltage, and controls a period of the high-frequency switching signal based on comparison between the terminal voltage of the capacitor and the sum of the low-level voltage and the high-level voltage; wherein under the control of the high-frequency switching signal, a capacitor is then charged and discharged based on a reference voltage to generate a base voltage, wherein the base voltage is related to the low-frequency PWM signal only in terms of a duty cycle of the low-frequency PWM signal; and
   a dimming-signal generation module, connected to an output of the base-voltage generation module, wherein the dimming-signal generation module outputs the base voltage as a dimming signal when the base voltage is greater than a predetermined voltage, and outputs a new PWM signal as the dimming signal when the base voltage is less than the predetermined voltage, wherein the new PWM signal has a magnitude equal to that of the predetermined voltage and a frequency independent of the low-frequency PWM signal, wherein the new PWM signal has an average value equal to that of the base voltage.

2. The LED dimming circuit according to claim 1, wherein the low-level-voltage generation module comprises:
a rising-edge detection unit, which generates a low-level-counting termination signal when a corresponding rising edge of the low-frequency PWM signal arrives;
a first counter, whose clock input is connected to the high-frequency clock signal and whose reset terminal is connected to an output of the rising-edge detection unit, wherein the first counter counts cycles of the high-frequency clock signal during the low level duration of the low-frequency PWM signal to obtain a low-level count, and performs a reset operation to complete the low-level counting operation when the low-level-counting termination signal is effective, and initiates a high-level counting operation at the same time as the reset operation;
a first digital-to-analog converter, connected to an output of the first counter, wherein the first digital-to-analog converter performs digital-to-analog conversion on a numerical value of the low level duration that is output from the first counter; and
a low-level-voltage latching unit, connected to an output of the first digital-to-analog converter, wherein when the low-level-counting termination signal is effective, the low-level-voltage latching unit latches what is output by the first digital-to-analog converter to obtain the low-level voltage;
wherein the high-level-voltage generation module comprises:
a falling-edge detection unit, which generates a high-level-counting termination signal when a falling edge of the low-frequency PWM signal arrives;
a second counter, whose clock input is connected to the high-frequency clock signal and whose reset terminal is connected to an output of the falling-edge detection unit, wherein the second counter counts cycles of the high-frequency clock signal during the high level duration of the low-frequency PWM signal to obtain a high-level count, and performs a reset operation to complete the high-level counting operation when the high-level-counting termination signal is effective, and initiates a low-level counting operation at the same time as the reset operation;
a second digital-to-analog converter, connected to an output of the second counter, wherein the second digital-to-analog converter performs digital-to-analog conversion on a numerical value of the high level duration that is output from the second counter; and
a high-level-voltage latching unit, connected to an output of the second digital-to-analog converter, wherein when the high-level-counting termination signal is effective, the high-level-voltage latching unit latches what is output by the second digital-to-analog converter to obtain the high-level voltage;
wherein the first counter is identical to the second counter, and the first digital-to-analog converter is identical to the second digital-to-analog converter.

3. The LED dimming circuit according to claim 2, wherein the low-level-voltage generation module and the high-level-voltage generation module share a counter and a digital-to-analog converter, the shared counter serves as both the first counter and the second counter, and the shared digital-to-analog converter serves as both the first digital-to-analog converter and the second digital-to-analog converter; wherein the reset terminal of the shared counter is connected to both the output of the rising-edge detection unit and the output of the falling-edge detection unit via a first adder, the output of the shared counter is connected to an input of the shared digital-to-analog converter, an output of the shared digital-to-analog converter is connected to both an input of the low-level-voltage latching unit and an input of the high-level-voltage latching unit.

4. The LED dimming circuit according to claim 3, wherein the low-level-voltage latching unit comprises a first switch and a first capacitor, wherein a control terminal of the first switch is connected to the output of the rising-edge detection unit, a first connection terminal of the first switch is connected to the output of the shared digital-to-analog converter, a second connection terminal of the first switch is connected to a first terminal of the first capacitor and serves as the output of the low-level-voltage generation module, and a second terminal of the first capacitor is grounded;
wherein the high-level-voltage latching unit comprises a second switch and a second capacitor, wherein a control terminal of the second switch is connected to the output of the falling-edge detection unit, a first connection terminal of the second switch is connected to the output of the shared digital-to-analog converter, a second connection terminal of the second switch is connected to a first terminal of the second capacitor and serves as the output of the high-level-voltage generation module, and a second terminal of the second capacitor is grounded.

5. The LED dimming circuit according to claim 4, wherein the LED dimming circuit further comprises:
a low-level-voltage clearing module, connected to both terminals of the first capacitor, wherein the low-level-voltage clearing module clears the low-level voltage latched in the first capacitor when the low-frequency PWM signal is a high level and the shared counter overflows; and
a high-level-voltage clearing module, connected to both terminals of the second capacitor, wherein the high-level-voltage clearing module clears the high-level voltage latched in the second capacitor when the low-frequency PWM signal is a low level and the shared counter overflows.

6. The LED dimming circuit according to claim 5, wherein the low-level-voltage clearing module comprises:
a high-level detection unit, which generates a high-level detection signal when the low-frequency PWM signal is a high level;
a first AND gate, one input of which is connected to the output of the high-level detection unit and the other input of which is connected to an overflow terminal of the shared counter, wherein the first AND gate generates a low-level-voltage-clearing drive signal when the high-level detection signal is effective and the shared counter overflows; and
a first MOS transistor, wherein the first MOS transistor has a gate connected to an output of the first AND gate, a drain connected to one terminal of the first capacitor and a source connected to the other terminal of the first capacitor, wherein the first MOS transistor conducts when the low-level-voltage-clearing drive signal is effective, in order to clear the low-level voltage latched in the first capacitor;

wherein the high-level-voltage clearing module comprises:

a low-level detection unit, which generates a low-level detection signal when the low-frequency PWM signal is a low level;

a second AND gate, one input of which is connected to the output of the low-level detection unit and the other input of which is connected to an overflow terminal of the shared counter, wherein the second AND gate generates a high-level-voltage-clearing drive signal when the low-level detection signal is effective and the shared counter overflows; and a second MOS transistor, wherein the second MOS transistor has a gate connected to an output of the second AND gate, a drain connected to one terminal of the second capacitor and a source connected to the other terminal of the second capacitor, wherein the second MOS transistor conducts when the high-level-voltage-clearing drive signal is effective, in order to clear the high-level voltage latched in the second capacitor.

7. The LED dimming circuit according to claim 6, wherein the low-level-voltage generation module further comprises:

an auxiliary low-level transmission unit, connected between the shared digital-to-analog converter and the first capacitor, wherein the auxiliary low-level transmission unit transmits what is output by the shared digital-to-analog converter to the first capacitor when the low-level detection signal is effective;

wherein the high-level-voltage generation module further comprises:

an auxiliary high-level transmission unit, connected between the shared digital-to-analog converter and the second capacitor, wherein the auxiliary high-level transmission unit transmits what is output by the shared digital-to-analog converter to the second capacitor when the high-level detection signal is effective.

8. The LED dimming circuit according to claim 7, wherein the auxiliary low-level transmission unit comprises a third switch and a first diode, wherein a control terminal of the third switch is connected to the output of the low-level detection unit, a first connection terminal of the third switch is connected to the output of the shared digital-to-analog converter, a second connection terminal of the third switch is connected to a positive terminal of the first diode, a negative terminal of the first diode is connected to one terminal of the first capacitor;

wherein the auxiliary high-level transmission unit comprises a fourth switch and a second diode, wherein a control terminal of the fourth switch is connected to the output of the high-level detection unit, a first connection terminal of the fourth switch is connected to the output of the shared digital-to-analog converter, a second connection terminal of the fourth switch is connected to a positive terminal of the second diode, a negative terminal of the second diode is connected to one terminal of the second capacitor.

9. The LED dimming circuit according to claim 1, wherein the base-voltage generation module comprises:

a low-level-voltage caching unit, connected to the output of the low-level-voltage generation module, for caching the low-level voltage;

a high-level-voltage caching unit, connected to the output of the high-level-voltage generation module, for caching the high-level voltage;

a constant current source and a third capacitor, wherein a current input of the constant current source is connected to a supply voltage, a current output of the constant current source is connected to one terminal of the third capacitor and the other terminal of the third capacitor is grounded, wherein the constant current source charges the third capacitor by a constant current provided by the constant current source to produce a capacitor terminal voltage at one terminal of the third capacitor;

a first comparator, which has an in-phase input connected to one terminal of the third capacitor and an inverting input connected to an output of the high-level-voltage caching unit, wherein the first comparator compares the capacitor terminal voltage with the high-level voltage and obtains the high-frequency switching signal based on a result of the comparison; and a second comparator, which has an in-phase input connected to one terminal of the third capacitor and an inverting input connected to an output of the low-level-voltage caching unit and the output of the high-level-voltage caching unit via a second adder, wherein the second comparator compares the capacitor terminal voltage with the sum of the low-level voltage and the high-level-voltage, and generates a discharge drive signal when the capacitor terminal voltage is not less than the sum of the low-level voltage and the high-level voltage;

a third MOS transistor, which has a gate connected to the output of the second comparator, a drain connected to one terminal of the third capacitor and a source connected to the other terminal of the third capacitor, wherein the third MOS transistor conducts when the discharge drive signal is effective in order to perform a discharge operation on the third capacitor and then to start a new cycle after the discharge operation ends, thereby controlling a period of the high-frequency switching signal; and a base-voltage generation unit, connected to an output of the first comparator, wherein the base-voltage generation unit charges and discharges a capacitor to generate the base voltage based on the reference voltage, under the control of the high-frequency switching signal.

10. The LED dimming circuit according to claim 9, wherein the base-voltage generation unit comprises: a first resistor, a second resistor, a fifth switch, a fourth capacitor, and an operational amplifier, wherein one terminal of the first resistor is connected to the reference voltage, the other terminal of the first resistor is connected to a first connection terminal of the fifth switch and to one terminal of the second resistor, a control terminal of the fifth switch is connected to the output of the first comparator, a second connection terminal of the fifth switch is grounded, the other terminal of the second resistor is connected to one terminal of the fourth capacitor and an in-phase input of the operational amplifier, the other terminal of the fourth capacitor is grounded, an inverting input of the operational amplifier is connected to an output of the operational amplifier and serves as an output of the base-voltage generation module.

11. The LED dimming circuit according to claim 1, wherein the dimming-signal generation module comprises:

a switch-control-signal generation unit, which generates an analog-output switch control signal when the base voltage is greater than the predetermined voltage, and generates a PWM-output switch control signal when the base voltage is less than the predetermined voltage, based on the high-level count of the low-frequency PWM signal and a count of cycles of the high-frequency clock signal by a loop counter; and an output control unit, connected to the output of the base-voltage generation module and an output of the switch-control-signal generation unit, wherein the output control unit outputs the base voltage as a dimming signal under the control of the analog-output signal when the base voltage is greater than the predetermined voltage; and when the base voltage is less than the predetermined voltage, outputs the new PWM signal as the dimming signal under the control of the PWM-output switch control signal.

12. The LED dimming circuit according to claim 11, wherein the switch-control-signal generation unit comprises:

a register, which latches the high-level count in the high-level-voltage generation module when a falling edge of the low-frequency PWM signal arrives;

a loop counter, whose clock input is connected to the high-frequency clock signal, which performs loop counting of cycles of the high-frequency clock signal;

an exclusive-OR gate, one input of which is connected to an output of the register and the other input of which is connected to an output of the loop counter, used for generating a clock-trigger signal when the high-level count latched in the register coincides with the count of cycles of the high-frequency clock signal by the loop counter;

a third AND gate, one input of which is connected to an overflow terminal of the loop counter via a first inverter, and another input of which is connected to a control signal output of the output control unit, for generating a setting-trigger signal when the base voltage is greater than the predetermined voltage or when the loop counter overflows; and a D flip-flop, which has a clock input connected to an output of the exclusive-OR, a data terminal connected to a low level, a setting terminal connected to an output of the third AND gate, and an output used as an output of the switch-control-signal generation unit, wherein the D flip-flop generates a switch-on signal when the setting-trigger signal is effective and a switch-off signal when the clock-trigger signal is effective.

13. The LED dimming circuit according to claim 11, wherein the output control unit comprises: a second inverter, a third comparator, a sixth switch, a seventh switch, and an eighth switch, wherein an in-phase input of the third comparator is connected to the output of the base-voltage generation module and a first connection terminal of the sixth switch, wherein an inverting input of the third comparator is connected to a first connection terminal of the seventh switch and the predetermined voltage, wherein an output of the third comparator is connected to an input of the second inverter and a control terminal of the sixth switch, wherein an output of the second inverter is connected to a control terminal of the seventh switch and serves as the control signal output of the output control unit, wherein a second connection terminal of the sixth switch is connected to a second connection terminal of the seventh switch and a first connection terminal of the eighth switch, wherein a control terminal of the eighth switch is connected to an output terminal of the switch-control-signal generation unit, and a second connection terminal of the eighth switch serves as a dimming-signal output terminal of the dimming-signal generation module.

14. The LED dimming circuit according to claim 2, wherein the base-voltage generation module comprises:

a low-level-voltage caching unit, connected to the output of the low-level-voltage generation module, for caching the low-level voltage;

a high-level-voltage caching unit, connected to the output of the high-level-voltage generation module, for caching the high-level voltage;

a constant current source and a third capacitor, wherein a current input of the constant current source is connected to a supply voltage, a current output of the constant current source is connected to one terminal of the third capacitor and the other terminal of the third capacitor is grounded, wherein the constant current source charges the third capacitor by a constant current provided by the constant current source to produce a capacitor terminal voltage at one terminal of the third capacitor;

a first comparator, which has an in-phase input connected to one terminal of the third capacitor and an inverting input connected to an output of the high-level-voltage caching unit, wherein the first comparator compares the capacitor terminal voltage with the high-level voltage and obtains the high-frequency switching signal based on a result of the comparison;

a second comparator, which has an in-phase input connected to one terminal of the third capacitor and an inverting input connected to an output of the low-level-voltage caching unit and the output of the high-level-voltage caching unit via a second adder, wherein the second comparator compares the capacitor terminal voltage with the sum of the low-level voltage and the high-level voltage, and generates a discharge drive signal when the capacitor terminal voltage is not less than the sum of the low-level voltage and the high-level voltage;

a third MOS transistor, which has a gate connected to the output of the second comparator, a drain connected to one terminal of the third capacitor and a source connected to the other terminal of the third capacitor, wherein the third MOS transistor conducts when the discharge drive signal is effective in order to perform a discharge operation on the third capacitor and then to start a new cycle after the discharge operation ends, thereby controlling a period of the high-frequency switching signal; and a base-voltage generation unit, connected to an output of the first comparator, wherein the base-voltage generation unit charges and discharges a capacitor to generate the base voltage based on the reference voltage, under the control of the high-frequency switching signal.

15. The LED dimming circuit according to claim 3, wherein the base-voltage generation module comprises:

a low-level-voltage caching unit, connected to the output of the low-level-voltage generation module, for caching the low-level voltage;

a high-level-voltage caching unit, connected to the output of the high-level-voltage generation module, for caching the high-level voltage;

a constant current source and a third capacitor, wherein a current input of the constant current source is connected to a supply voltage, a current output of the constant current source is connected to one terminal of the third capacitor and the other terminal of the third capacitor is grounded, wherein the constant current source charges the third capacitor by a constant current provided by the constant current source to produce a capacitor terminal voltage at one terminal of the third capacitor;

a first comparator, which has an in-phase input connected to one terminal of the third capacitor and an inverting input connected to an output of the high-level-voltage caching unit, wherein the first comparator compares the capacitor terminal voltage with the high-level voltage and obtains the high-frequency switching signal based on a result of the comparison;

a second comparator, which has an in-phase input connected to one terminal of the third capacitor and an inverting input connected to an output of the low-level-voltage caching unit and the output of the high-level-voltage caching unit via a second adder, wherein the second comparator compares the capacitor terminal voltage with the sum of the low-level voltage and the high-level voltage, and generates a discharge drive signal when the capacitor terminal voltage is not less than the sum of the low-level voltage and the high-level voltage;

a third MOS transistor, which has a gate connected to the output of the second comparator, a drain connected to one terminal of the third capacitor and a source connected to the other terminal of the third capacitor, wherein the third MOS transistor conducts when the discharge drive signal is effective in order to perform a discharge operation on the third capacitor and then to start a new cycle after the discharge operation ends, thereby controlling a period of the high-frequency switching signal; and a base-voltage generation unit, connected to an output of the first comparator, wherein the base-voltage generation unit charges and discharges a capacitor to generate the base voltage based on the reference voltage, under the control of the high-frequency switching signal.

* * * * *